Feb. 26, 1952  F. HERZEGH  2,587,470
PNEUMATIC TIRE
Filed Dec. 14, 1946
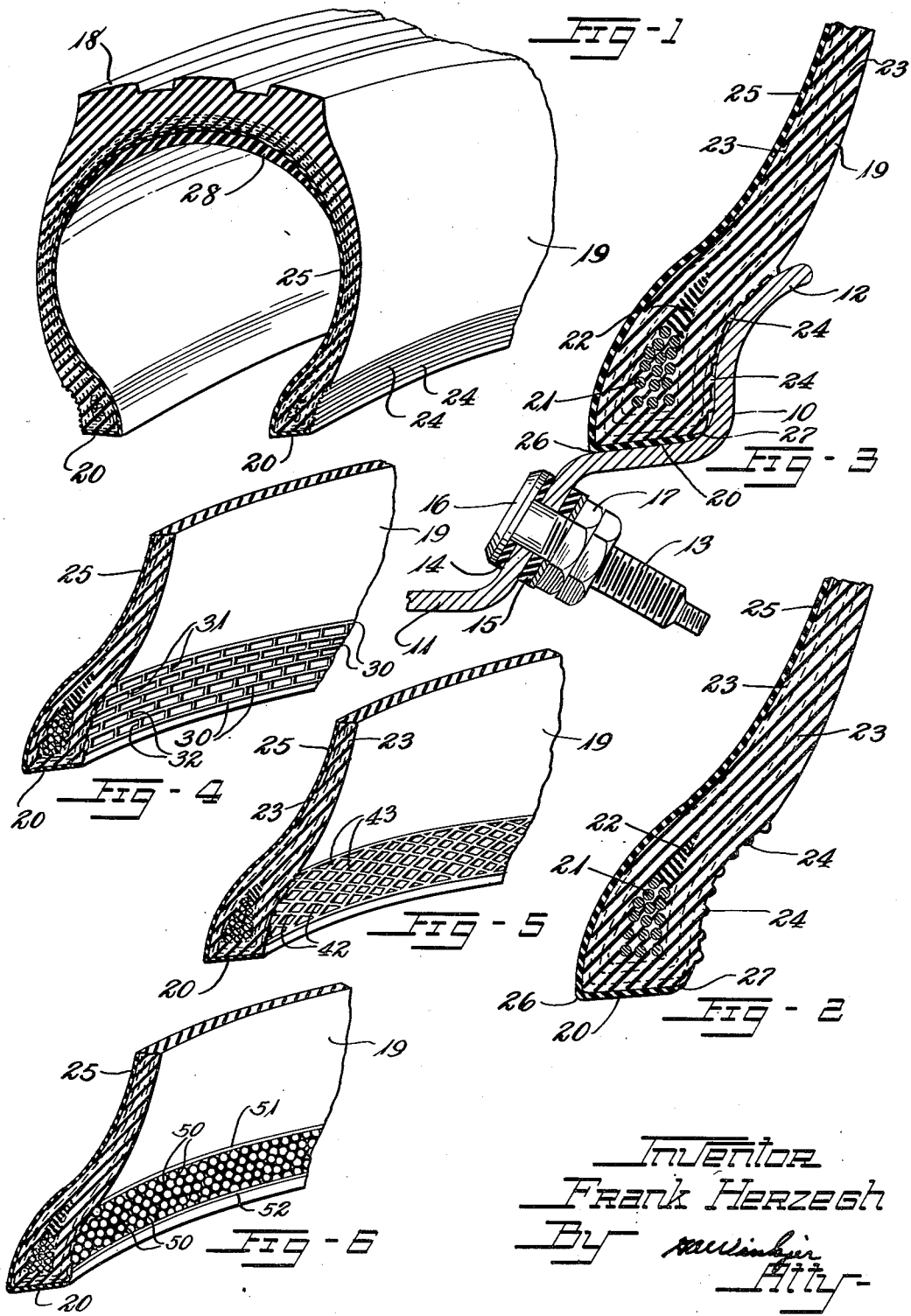
Inventor
Frank Herzegh
By
Att'y Patented Feb. 26, 1952

2,587,470

UNITED STATES PATENT OFFICE 2,587,470

PNEUMATIC TIRE

Frank Herzegh, Shaker Heights, Ohio, assignor to The B. F. Goodrich Company, New York, N. Y., a corporation of New York Application December 14, 1946, Serial No. 716,276

20 Claims. (Cl. 152—330)

This invention relates to pneumatic tires and is advantageous especially where it is desired to use the tire without an inner tube.

In order to render the conventional open-bellied type of automobile tire casing fully practical for use without an inner tube, it is necessary to provide effectively for sealing at the bead portions of the casing and for maintaining the seal under continued operation, and also to provide for preventing objectionable leakage into and through the wall of the casing despite the fact that the assembly will lack the benefit of an inner tube to prevent the air under pressure from acting directly against the tire wall. At the same time it is necessary to maintain the ability of the tire to withstand the rigors of service, and especially to withstand the effects of rapid cyclic flexure and heating in high speed service such as in the case of passenger automobiles. Despite the considerable efforts that have been made in the past to attain these ends, the prior proposed constructions have for one reason or another not been fully satisfactory, and have not received wide acceptance.

One difficulty heretofore is that devices proposed for sealing against leakage of air at the bead portions of the tire have been overly cumbersome and difficult to install, have required special rim constructions or have not provided satisfactory sealing. Another difficulty with constructions proposed heretofore is that without the benefit of an inner tube the tire wall has had to take the whole of the gradient of air pressure from inside to outside and as a result of diffusion of air into the wall has been vulnerable to the formation of blisters in the wall and separation of the embedded fabric plies from the rubber, which has led to early failure of the tire. This difficulty has been present especially in tires for high speed service where the heat developed from the rapid flexure of the tire walls has caused expansion of air diffused into and pocketed in the wall, which in turn has caused or aggravated separations of the tire material. Rubber composition heretofore used in tire wall construction have not provided a sufficiently high resistance to diffusion of the air into the tire wall to prevent this difficulty in a satisfactory manner. Efforts to thicken this rubber at the inner face of the tire to raise the resistance to diffusion through this rubber sufficiently have had the objection that the resulting increase in thickness of the tire wall has made the tire more vulnerable to the development of heat under rapid cyclic flexure and has increased the weight of the tire and the cost thereof objectionably.

While the use of the conventional inner tube makes it possible to relieve the tire casing of the burden of taking the whole of the pressure gradient, owing to communication of the space between the inner tube and tire with the atmosphere through the valve stem opening of the rim and around the bead portions of the tire, the inner tube adds to the cost, promotes objectionable heating, is often inconvenient to remove and repair in the event of punctures and has other objections such that the omission of the inner tube is desirable in many cases. It is a purpose of this invention to overcome the above-discussed and other difficulties and to make the omission of the inner tube entirely feasible.

It is an object of this invention to provide with full effectiveness and commercial practicability a pneumatic tire that is suited to use without an inner tube, and especially to provide such a tire for use on existing straight-side rims with no need for altering the rim constructions that have become standard.

Further objects are to provide for sealing against entrance of air, water, sand, or other substances between the tire bead portions and the rim flanges, to provide for maintaining the seal despite rocking movements of the bead portions under extreme deflections of the tire, and to provide a tire construction that can be conveniently mounted and demounted without injury to the sealing portions of the tire.

Still further objects are to provide a high resistance to diffusion of air into and through the wall of the tire; and to provide this high degree of impermeability together with ability of the tire wall to withstand the effects of rapid cyclic flexure of the wall in use, and especially to provide for avoiding objectionable effects of heat under such conditions; to provide a tire construction in which the gradient of air pressure from the inner face to the outer face is such that an objectionably high rate of diffusion does not occur, to avoid the formation of blisters and ply separation within the tire wall, to make possible long periods of operation without reinflation. A further and related object is to include provision in the tire for puncture sealing.

The foregoing and other objects will be apparent from the following description, reference being had to the accompanying drawings in which:

Fig. 1 is a cross-sectional view in perspective of a tire constructed in accordance with and embodying the invention.

Fig. 2 is a cross-section on an enlarged scale of a part of a tire wall including a bead portion thereof.

Fig. 3 is a view like Fig. 2, but showing the tire mounted upon a standard rim of the straight-side type.

Fig. 4 is a view in cross-section and perspective showing a further embodiment of the invention, parts being broken away.

Figs. 5 and 6 are views like Fig. 4, but showing further embodiments of the invention.

The invention contemplates a tire that can be used upon standard existing rims of the so-called straight-side type, for example a rim of the type shown at 10 in Fig. 3, having a base 11 which may be of the drop-center type with straight-side flanges, one of which is shown at 12, this type of flange normally rising from the base generally straight and then curving outward as shown. Inasmuch as the tire of the invention is suitable for use without an inner tube, an inflating valve 13 may be mounted directly in the rim and sealed thereto as by resilient washers 14, 15 clamped against the rim between the flange 16 of the valve stem and a mounting nut 17. The valve then permits inflation of the space directly between the tire and the rim.

The tire comprises a body of natural rubber or other rubber-like material having a tread portion 18 and wall portions 19 terminating in bead portions 20, 20 which may comprise the usual rings of bead wire 21 encased in rubber or other rubber-like material 22. The tire wall is reinforced by plies 23, 23 embedded therein, which may be of any suitable material for the purpose, such as woven or weftless cord fabric of cotton, rayon, wire or the like. The tire illustrated has four cord plies in its wall, although the number of plies and the material thereof may be varied as desired.

Provision is made for sealing the tires at the straight-side rim flanges 12. The axial outer face of the bead portion is formed with a plurality of ribs 24, 24 extending in a circumferentially continuous manner about the tire. These ribs are of resilient rubber or other rubber-like material and preferably are molded integrally with the bead portion of the tire wall. The ribs are urged in the axially outward direction against the rim flange by the inflation pressure within the tire and effect a seal not only against the leakage of air from within the tire past the bead portion, but also a seal against the entrance of water, soil or other foreign matter from without, and the sealing in this manner is advantageous further in being maintained effectively even under conditions of rocking of the bead portions under extreme deflections of the tire. Further, I have found that it is possible to insert tire tools between the rim and the bead portions for assisting in demounting the tire without injury to the ribs, the heel of the bead portion taking the prying action of the tool.

It is preferred that each rib be of a height in the axial direction of the tire not greater than the thickness of the rib in the direction radially of the tire, so that the rib will maintain stability as it is pressed against the rim flange without twisting out of shape or tilting over objectionably, and will form an effective seal continuously around the tire. Good results have been obtained with a shape of the rib generally semi-circular in cross-section as shown, providing rounded rim engaging faces. The ribs 24, 24 are spaced-apart radially of the tire to permit distortion of the material of the rib into the zones between the ribs, thereby increasing the ability of the rib to conform to the face of the rim flange for effective sealing despite irregularities that may be present in the flange surface. The provision of spaces between the ribs has the further advantage of providing labyrinth chambers in the event of any slight leakage that may occur past one or more ribs so that the total pressure drop from within the tire to outside is divided into a plurality of small drops of pressure, which arrangement has the advantage of greatly reducing the rate of leakage. In practice I have found that the construction above described maintains a tight seal indefinitely.

If it be desired to add a filling material between the ribs 24, 24, a plastic filling material of suitable yieldability may be used, or a vulcanized rubber or other rubber-like composition of suitably low modulus or of spongy character, so as to permit the resilient material of the ribs to adjust itself in sealing relation to the surface of the flange when pressed against the latter. Such filling material, if used, may be added after the ribs 24, 24 are formed and at least partially vulcanized.

In order to overcome the difficulties hereinbefore discussed resulting from the relatively high permeability of rubber compositions heretofore used in tire walls, I provide the tire wall at its inner face with a lining layer 25 of suitable flexible, durable and relatively impermeable material to prevent excessive diffusion into and through the wall, such diffusion as hereinabove discussed, being objectionable not only from the standpoint of loss of inflation pressure but also because a high rate of diffusion of air into the wall tends to develop blisters and separation of the fabric plies from the rubber and lessens the service life of the tire. The lining layer 25 preferably is extended down to the bead portions, around the toe 26 of the bead portion and to the heel 27.

The butyl type of synthetic rubbers, which are copolymers of isobutylene and a diolefine such as butadiene or isoprene, are found to be well suited for the purpose of this lining layer 25. The lining layer of such butyl type rubber at the inner face of the tire and adhered to the rubber of the tire wall so as to constitute an integral part of the wall is found to render the walls highly impervious to the air under pressure directly against it, so that diffusion into the wall such as would be likely to cause blisters and ply separation is effectively prevented. At the same time such butyl type rubber exhibits good properties of flexibility and resilience and gives good results even when the layer is relatively thin, so that this lining layer together with the fabric reinforced rubber composition normally used in the tire body are as a composite unit well able to withstand rapid cyclic flexing stresses in use.

As an example, intended as being illustrative rather than wholly limiting, the following butyl type rubber composition, in a thickness of the lining layer 25 of the order of .04 inch and even lower, depending on the type of service, has given excellent results for the purposes of this invention in extensive tire tests:

Parts by weight:
| | |
|---|---|
| Butyl rubber | 100.00 |
| Carbon black | 50.00 |
| Zinc oxide | 5.20 |
| Stearic acid | 1.00 |
| Softener | 1.00 |
| Sulphur | 2.00 |
| Accelerators | 1.60 |

If desired, the tire additionally may be provided in the crown region with a layer 28 of puncture-sealing material which may include butyl type rubber to increase its compatibility with the lining layer 25 and avoid the natural reluctance of other rubber materials to adhere to the butyl rubber lining layer. The following is an illustrative example of a composition which has given good results for the puncture sealing layer 28.

Parts by weight:
| | |
|---|---|
| Butyl rubber | 100.00 |
| Iron oxide | 75.00 |
| Cumar resin | 20.00 |
| Mineral oil | 20.00 |
| Sulphur | .50 |
| Accelerators | .50 |

The plastic, adherent mixture of this puncture-sealing material affords adhesion for maintaining the layer in place and for closing ruptures made by puncturing bodies especially by virtue of the adhesion of this material to itself and to the walls of the rupture in a self-sealing action as it is drawn into the hole by its tendency to cling to the puncturing body as the latter is removed from the tire. Both the lining layer 25 and the puncture sealing layer 28 are preferably built into the tire and adhered therein by their natural tack or with the aid of adhesives so as to be a part thereof when it is subjected to the vulcanizing operation, the completed tire being vulcanized to provide a unitary construction.

In addition to the advantages of the tire constructed as herein described, for use without an inner tube, the construction is advantageous also in simplifying manufacture, in that the sealing layer 25 is highly impervious not only to air, but also to other fluids such as water and steam. This makes it practical to vulcanize and mold the tire without the use of curing bags for the internal inflating and heating fluid. Even though the fluid is brought into direct contact with the interior of the tire, the lining 25 has the advantage of preventing the fluid from penetrating the materials of the tire body objectionably in their heated and softened condition, which penetration is likely to produce objectionable blisters and ply separation. The butyl type rubber hereinabove discussed for the liner 25 is found to be well suited for this purpose also.

In the foregoing description of the embodiment of Figs. 1 to 3, the sealing ribs 24, 24 are preferably concentric with the tire and have continuously annular spaces between them. This provides for a plurality of sealed channels between the ribs in each of which the pocketed air may circulate about the tire. If desired as a further security against leakage, the channels may be divided into pockets circumferentially of the tire as well as in the radial direction by ribs or portions thereof. For example, with reference to the embodiment of Fig. 4, the tire may have circumferentially continuous ribs 30, 30 providing a plurality of annular channels between them and each channel may have rib portions 31, 31, 32, 32 joining the ribs to provide a plurality of individual pockets in succession both radially of the tire and circumferentially thereof, which pockets are closed by pressure of the ribs against the rim flanges. In the embodiment of Fig. 5, a pair of circumferentially continuous ribs is provided, these being united by a series of diagonally disposed and crossed ribs 42, 42 and 43, 43 providing again a series of pockets between the ribs in both the radial and circumferential direction of the tire. A succession of pockets may be provided also by curved ribs, for example, in the form of a plurality of circles merging with one another as shown at 50, 50 in Fig. 6. Circumferentially continuous ribs 51, 52 may be provided at the radial extremities of the curved ribs.

Variations may be made within the scope of the invention as it is defined in the following claims.

I claim:

1. A pneumatic tire suitable for use without an inner tube, said tire comprising an open-bellied body terminating in spaced-apart bead portions, said tire having an inner lining adhered thereto and extending from bead portion to bead portion of the tire, said lining comprising butyl type rubber composition of less permeability to air than the material of the tire outwardly thereof, air-sealing means at said bead portions, and a layer of plastic adhesive puncture-sealing material comprising butyl type rubber in the crown region of the tire adhesively compatible with and united with said lining and by virtue of its adhesive property being self-sealing of punctures in said region of the tire.

2. A pneumatic tire suitable for use upon a rim without an inner tube, said tire comprising an open-bellied body having spaced-apart bead portions for seating at flanges of a rim, said body comprising at its inner face a thickness of butyl type rubber composition adhered to said face and extending from bead portion to bead portion of the tire, a plurality of circumferentially continuous ribs of resilient rubber-like material at the outer face of each bead portion in succession in the direction radially of the tire for sealing with the rim flanges under inflation pressure within the tire by the resulting pressure of the ribs against the rim flanges, and a layer of plastic adhesive puncture-sealing material comprising butyl type rubber in the crown region of the tire adhesively compatible with and united with said butyl type rubber composition, said puncture-sealing material by virtue of its adhesive property being self-sealing of punctures in said region of the tire.

3. A pneumatic tire comprising a body of rubber-like material having plies of reinforcing material embedded therein and adhered thereto, said body comprising at the inner face of the tire butyl type rubber composition united integrally with said body and providing low permeability to fluid under pressure within said tire, and a layer of plastic adhesive puncture-sealing material comprising butyl type rubber in the crown region of the tire adhesively compatible with and united with said butyl type rubber composition, said puncture-sealing material by virtue of its adhesive property being self-sealing of punctures in said region of the tire.

4. A pneumatic tire comprising an open-bellied body terminating in spaced-apart bead portions, said body comprising rubber-like material having plies of cord fabric extending from bead portion to bead portion and embedded therein and adhered thereto, and said body having at the inner face of the tire butyl type rubber composition united with and constituting a part of said body and providing low permeability to fluid under pressure within said tire, and a layer of plastic adhesive puncture-sealing material comprising butyl type rubber in the crown region of the tire adhesively compatible with and united with said butyl type rubber composition, said puncture-sealing material by virtue of its adhesive property being self-sealing of punctures in said region of the tire.

5. An inflatable tire suitable for use without an inner tube, said tire comprising an open-bellied hollow annular body for seating upon an annular fluid-tight channel rim of conventional straight side form, said body having side walls terminating in spaced-apart bead portions for seating at flanges of said rim under pressure within the tire urging said bead portions apart, said bead portions having a plurality of circumferential ribs of resilient rubber-like material at the axially outer faces thereof for sealing engagement with the rim flanges, a lining of substantially impervious butyl type rubber-like material extending over the inner face of the tire, and a puncture-sealing layer of plastic adherent butyl type rubber-like material at the crown region of the tire adhesively compatible with said lining and by virtue of its adherent property being self-sealing of punctures in said region of the tire.

6. An inflatable tire suitable for use without an inner tube, said tire comprising an open-bellied hollow annular body for seating upon an annular fluid-tight channel rim of conventional straight-side form, said body having outwardly-bowed side walls terminating in spaced-apart bead portions for seating at flanges of said rim when the tire is inflated, said tire when on said rim having a substantially greater maximum width than the bead spacing and having its greatest width at a circumferential zone of the tire about midway between the rim-contacting bases of said bead portions and the tread portion of the tire, said bead portions having a plurality of circumferential ribs of resilient rubber-like material at the axially outer faces thereof for sealing engagement with the rim flanges, a lining of substantially impervious rubber-like material extending completely over the inner face of the tire from bead portion to bead portion thereof, and a puncture-sealing layer of plastic adherent rubber-like material at the crown region of the tire adhesively compatible with and united with said lining and by virtue of its adherent property being self-sealing of punctures in said region of the tire.

7. An inflatable tire suitable for use without an inner tube, said tire comprising an open-bellied hollow annular body for seating upon an annular fluid-tight channel rim of conventional straight side form, said body having outwardly bowed side walls terminating in spaced-apart bead portions for seating at flanges of said rim when the tire is inflated, inextensible annular bead reinforcements in said bead portions, and flexible reinforcing material extending along said side walls from one annular bead reinforcement to the other and anchored thereto, said tire when on said rim having the greatest lateral spacing of said flexible reinforcing material from one of its side walls to the other at a circumferential zone of the tire about midway between the rim-contacting bases of said bead portions and the tread portion of the tire, said flexible reinforcing material in opposite side walls of the tire diverging outwardly from said bead reinforcements to the said zone of greatest lateral spacing so that a resultant pressure of the said bead portions against said flanges due to tension of said flexible reinforcing material under the pressure within the tire is provided, said bead portions having a plurality of circumferential ribs of resilient ruber-like material at the axially outer faces thereof for sealing engagement with the rim flanges, a lining of substantially impervious butyl type rubber-like material extending over the inner face of the tire from bead portion to bead portion thereof, and a puncture-sealing layer of plastic adherent butyl type rubber-like material at the crown region of the tire adhesively compatible with and united with said lining and by virtue of its adherent property being self-sealing of punctures in said region of the tire.

8. An inflatable tire suitable for use without an inner tube, said tire comprising an open-bellied hollow annular body for seating upon an annular fluid-tight rim of conventional straight-side form, said body having outwardly bowed side walls terminating in spaced-apart bead portions for seating at flanges of said rim when the tire is inflated, said tire when on said rim having the greatest lateral spacing of its side walls above the channel of said rim at a circumferential zone of the tire about midway between the rim-contacting bases of said bead portions and the tread portion of the tire, and the radial depth of the tire from the tread portion thereof to the bases of said bead portions being substantially equal to the width of the tire at said zone defining an inflation chamber of approximately round cross-section radially outward of said rim contacting bases, said bead portions having a plurality of circumferential ribs of resilient rubber-like material at the axially outer faces thereof for sealing engagement with the rim flanges and a lining of substantially impervious rubber-like material extending completely over the inner face of the tire from bead portion to bead portion thereof, and a layer of plastic adherent puncture-sealing material at the radial inner face of said lining in the crown region of the tire, said puncture-sealing material being adhesively compatible with and united with said lining and by virtue of its adherent property being self-sealing of punctures in said region of the tire.

9. An inflatable tire suitable for use without an inner tube, said tire comprising an open-bellied hollow annular body for seating upon an annular fluid-tight channel rim, said body having outwardly bowed side walls terminating in spaced-apart bead portions for seating at flanges of said rim when the tire is inflated, the arcuate extent of said tire body from bead portion to bead portion being such that upon inflation of the tire body to approximately circular cross-section with the bead portions in place on said rim the greatest width of the tire body will be at a circumferential zone about midway between the rim-contacting bases of said bead portions and the tread portion of the tire and will be substantially greater than the bead spacing, said bead portions having a plurality of circumferential ribs of resilient rubber-like material at the axially outer faces thereof for sealing engagement with the rim flanges, a lining of substantially impervious butyl type rubber composion extending over the inner face of the tire from bead portion to bead portion thereof, and a layer of plastic adherent puncture-sealing material comprising butyl type rubber at the radially inner face of said lining in the crown region of the tire, said puncture-sealing material being adhesively compatible with and united with said lining and by virtue of its adhesive property being self-sealing of punctures in said region of the tire.

10. An inflatable tire suitable for use without an inner tube, said tire comprising an open-bellied tension-resisting flexible body terminating in two annular inextensible beads for seating against the flanges of an annular fluid-tight channel rim, the body being of such flexibility and of such extent from bead to bead that when inflated with the beads in place against the rim flanges the body will assume a substantially circular cross-sectional shape from bead to bead with the width of the body substantially greater than the bead spacing and with the zone of greatest width of the body about midway between the internal rim-contacting faces of the beads and the tread portion of the tire so that tension in the body will produce a resultant pressure of the beads in an axial direction to hold them in contact with the rim flanges, a lining of substantially impervious butyl type rubber composition extending over the inner face of the tire from bead portion to bead portion thereof, and a layer of plastic adherent puncture-sealing material comprising butyl type rubber as a radial inner face of said lining in the crown region of the tire, said puncture-sealing material being adhesively compatible with and united with said lining and by virtue of its adhesive property being self-sealing of punctures in said region of the tire, and pressure-sealing ribs of resilient material on the rim-engaging faces of the beads.

11. A one-piece pneumatic tubeless tire comprising an open-bellied hollow annular body of arcuate cross section having a tread portion and outwardly bowed side walls terminating in spaced-apart bead portions adapted to seat on the flanges of an annular rim of straight-side flange construction, the arcuate extent of said body from bead portion to bead portion being such that upon inflation of said body with the bead portions seated on the rim flanges the maximum width of the body lies in a zone intermediate the bead and tread portions thereof and is substantially greater than the bead spacing, means for sealing the joints between the bead portions of said body and the flanges of said rim against the escape of air from within said body when the tire is inflated comprising a plurality of circumferentially continuous ribs molded integrally with an extending outwardly from the axially outer face of each of said bead portions, said ribs being of the same material as the side walls of said body and being urged into sealing engagement with the rim flanges by the air pressure within said body when the tire is inflated, and a relatively thin lining of substantially impervious butyl type rubber composition adherent to and completely covering the inner surface of said body, said lining extending continuously from one bead portion of the other and terminating short of said ribs on the outer faces of said bead portions.

12. A one-piece pneumatic tubeless tire comprising an open-bellied hollow annular body of arcuate cross section having a tread portion and outwardly bowed side walls of reinforced resilient rubber material terminating in spaced-apart bead portions adapted to seat on the flanges of an annular rim of straight-side flange construction, the arcuate extent of said body from bead portion to bead portion being such that upon inflation of said body with the bead portion seated on the rim flanges the maximum width of the body lies in a zone intermediate the bead and tread portions thereof and is substantially greater than the bead spacing, means for sealing the joints between the bead portions of said body and the flanges of said rim against the escape of air from within said body when the tire is inflated comprising a plurality of circumferentially continuous ribs molded of said rubber material of the side walls integrally with said bead portions and extending outwardly at the axially outer faces of said bead portions and being urged into sealing engagement with the rim flanges by the air pressure within said body when the tire is inflated, and a relatively thin lining of substantially impervious butyl type rubber composition adherent to and completely covering the inner surface of said body, said lining extending continuously from one bead portion to the other and terminating at the outer faces of said bead portions at a position to leave said rubber material of the ribs exposed for sealing contact with the flanges of said rim.

13. A one-piece pneumatic tubeless tire comprising an open-bellied hollow annular body of arcuate cross section having a tread portion and outwardly bowed side walls terminating in spaced-apart bead portions adapted to seat on the flanges of an annular rim of straight-side flange construction, the arcuate extent of said body from bead portion to bead portion being such that upon inflation of said body with the bead portions seated on said rim flanges the maximum width of the body lies in a zone intermediate the bead and tread portions thereof and is substantially greater than the bead spacing, means for sealing the joints between the bead portions of said body and the flanges of said rim against the escape of air from within said body when the tire is inflated comprising a plurality of circumferentially continuous ribs of resilient rubber material extending outwardly at the axially outer face of each of said bead portions, said ribs being convexly rounded in section and of greater width than depth and being urged into sealing engagement with the rim flanges by the air pressure within said body when the tire is inflated, and a relatively thin lining of substantially impervious butyl type rubber composition adherent to and completely covering the inner surface of said body, said lining extending continuously from one bead portion to the other and continuing around the toes of the bead portions and onto the radially innermost rim-contacting faces of the bead portions.

14. A one-piece pneumatic tubeless tire comprising an open-bellied hollow annular body of arcuate cross section having a tread portion and outwardly bowed side walls of reinforced resilient rubber material terminating in spaced-apart bead portions adapted to seat on the flanges of an annular rim of straight-side flange construction, the arcuate extent of said body from bead portion to bead portion being such that upon inflation of said body with the bead portion seated on the rim flanges the maximum width of the body lies in a zone intermediate the bead and tread portions thereof and is substantially greater than the bead spacing, means for sealing the joints between the bead portions of said body and the flanges of said rim against the escape of air from within said body when the tire is inflated comprising a plurality of ribs molded of said rubber material of the side walls integrally with said bead portions and extending outwardly at the axially outer face of said bead portions circumferentially about the same and being urged into sealing engagement with the rim flanges by the air pressure within said body when the tire is inflated, and the ribs on each bead portion including rib portions connecting other rib portions to interrupt circumferential continuity of the spaces between the ribs and provide thereby a plurality of spaces closed by said ribs in both the radial and circumferential directions of the tire to isolate air pockets between said ribs when the latter are in sealing engagement with the flanges of said rim.

15. A one-piece pneumatic tubeless tire as defined in claim 14 in which on each bead portion at its axially outer face a series of said ribs with interconnecting rib portions constitute a network of the ribs about the circumference of said bead portions providing a multiplicity of air-pocketing spaces between the rib portions distributed radially and circumferentially of the bead portions.

16. An inflatable tire suitable for use without an inner tube, said tire comprising an open-bellied hollow annular body for seating upon an annular fluid-tight channel rim of straight-side flanges, said body having a tread portion and side walls terminating in spaced-apart bead portions for seating at said flanges under pressure within the tire urging said bead portions apart, and a lining of substantially impervious material extending over the inner face of the tire, said bead portions having a plurality of ribs of resilient rubber material at the axially outer faces thereof for sealing engagement with the rim flanges, the ribs on each bead portion including portions connecting other portions to interrupt circumferential continuity of the spaces between the ribs in both the radial and circumferential directions of the tire and isolate air pockets between said ribs when the latter are in sealing engagement with the flanges of said rim.

17. An inflatable tire suitable for use without an inner tube, said tire comprising an open-bellied hollow annular body for seating upon an annular fluid-tight channel rim of straight-side flange construction, said body having a tread portion and side walls terminating in spaced-apart bead portions for seating at the rim flanges under pressure within the tire urging said bead portions apart, said bead portions having a plurality of circumferentially extending ribs of resilient rubber composition at the axially outer faces thereof for sealing engagement with the rim flanges, a relatively thin lining of substantially impervious butyl type rubber composition extending over the inner face of the side walls of the tire, and a puncture sealing layer of plastic adherent butyl type rubber composition in the crown region only of the tire underlying said tread portion and constituting the innermost face of the tire in the crown region and by virtue of its adherent property being self-sealing of punctures in the crown region.

18. An inflatable tire suitable for use without an inner tube, said tire comprising an open-bellied hollow annular body for seating upon an annular fluid-tight channel rim of straight-side flange construction, said body having outwardly-bowed side walls terminating in spaced-apart bead portions for seating at the flanges of said rim when the tire is inflated, said tire when on said rim having a substantially greater maximum width than the bead spacing and having its greatest width at a circumferential zone of the tire about midway between the rim-contacting bases of said bead portions and the tread portion of the tire, said bead portions having a plurality of circumferential ribs of resilient rubber-like material at the axially outer faces thereof for sealing engagement with the rim flanges, a relatively thin lining of substantially impervious butyl type rubber composition extending over the inner face of the tire between said ribs from bead portion to bead portion, and a puncture sealing layer of plastic adherent butyl type rubber composition in the crown region only of the tire underlying tread portion and said lining and constituting the innermost face of the tire in the crown region and by virtue of its adherent property being adherent to said lining layer and being self-sealing of punctures in said region.

19. A one-piece pneumatic tubeless tire comprising an open-bellied hollow annular body of arcuate cross section having a tread portion and outwardly bowed side walls terminating in spaced-apart bead portions adapted to seat on the flanges of an annular rim of straight-side flange construction, the arcuate extent of said body from bead portion to bead portion being such that upon inflation of said body with the bead portions seated on said rim flanges the maximum width of the body lies in a zone intermediate the bead and tread portions thereof and is substantially greater than the bead spacing, means for sealing the joints between the bead portions of said body and the flanges of said rim against the escape of air from within said body when the tire is inflated comprising a plurality of circumferentially continuous ribs molded integrally with said bead portions and extending outwardly from the axially outer face of said bead portions, said ribs being of the same material as the side walls of said body and being urged into sealing engagement with the rim flanges by the air pressure within said body when the tire is inflated and said ribs in their undistorted shape prior to being pressed against the rim flanges having an outwardly convex, approximately semi-circular cross-section, and a relatively thin lining of substantially impervious butyl type rubber composition adherent to and completely covering the inner surface of said body, said lining extending continuously from one bead portion to the other and terminating short of the outer surfaces of said ribs on said bead portions.

20. An inflatable tire suitable for use without an inner tube, said tire comprising an open-bellied hollow annular body for seating upon an annular fluid-tight channel rim of conventional straight-side form, said body having outwardly-bowed side walls terminating in spaced-apart bead portions for seating at flanges of said rim when the tire is inflated, said tire when on said rim having greater maximum width than the bead spacing and having its greatest width at a circumferential zone of the tire about midway between the rim-contacting bases of said bead portions and the tread portion of the tire, and a lining of substantially impervious material extending over the inner face of the tire, and said bead portions having a plurality of ribs of resilient rubber composition at the axially outer faces hereof for sealing engagement with the rim flanges, said ribs in their undistorted shape prior to being pressed against the rim flanges having an outwardly convex, rounded cross-section of substantially greater width than depth for stability against lateral tilting when pressure is applied to the ribs.

FRANK HERZEGH.

REFERENCES CITED

The following references are of record in the file of this patent:

UNITED STATES PATENTS

| Number | Name | Date |
|---|---|---|
| 1,443,652 | Savage | Jan. 30, 1923 |
| 1,915,963 | Wait | June 27, 1933 |
| 2,007,825 | Day | July 9, 1935 |
| 2,255,146 | Becker | Sept. 9, 1941 |
| 2,331,795 | McMahan | Oct. 12, 1943 |
| 2,356,128 | Thomas et al. | Aug. 22, 1944 |
| 2,467,322 | Lightbown et al. | Apr. 12, 1949 |
| 2,489,995 | Young | Nov. 29, 1949 |
| 2,522,776 | Busse | Sept. 19, 1950 |

FOREIGN PATENTS

| Number | Country | Date |
|---|---|---|
| 42,198 | Denmark | 1930 |
| 345,879 | France | 1904 |
| 439,869 | Great Britain | 1934 |